United States Patent [19]

Reimoser

[11] 4,127,972
[45] Dec. 5, 1978

[54] MEANS FOR MARKING OF POINTS WITHIN THE TERRAIN

[76] Inventor: Fritz Reimoser, Klammstrasse 21, Weiz, Austria, 8160

[21] Appl. No.: 769,751

[22] Filed: Feb. 17, 1977

[30] Foreign Application Priority Data

Feb. 17, 1976 [AT] Austria .................................. 1097/76

[51] Int. Cl.² .......................... E01F 9/02; G01C 15/02
[52] U.S. Cl. ........................................ 52/103; 33/293; 116/114 R
[58] Field of Search ............. 116/133, 114 R; 33/293; 52/103; 235/117 R

[56] References Cited

U.S. PATENT DOCUMENTS

| D.234,098 | 1/1975 | Coumbs | 33/293 X |
| 2,654,338 | 10/1953 | Deal | 116/114 R |
| 2,660,822 | 12/1953 | Hargus | 116/114 R |
| 2,773,470 | 12/1956 | Alger | 52/103 X |
| 3,307,264 | 11/1965 | Wolfe, Jr. | 33/293 X |
| 3,321,834 | 5/1967 | Burns | 33/293 |
| 3,600,812 | 8/1971 | Cromoga | 33/293 |
| 3,785,331 | 1/1974 | Ferris | 52/103 X |
| 3,899,856 | 8/1975 | Johnson | 52/103 X |
| 3,973,327 | 8/1976 | Cardinale | 33/293 X |

Primary Examiner—Daniel M. Yasich
Attorney, Agent, or Firm—Salter & Michaelson

[57] ABSTRACT

Means for marking points within the terrain include an anchoring element and a marking element secured thereto, said marking element being a horizontally disposed disc having a plurality of flap-like protrusions extending radially from the axis of said disc, the disc and protrusions having marking indicia thereon.

11 Claims, 9 Drawing Figures

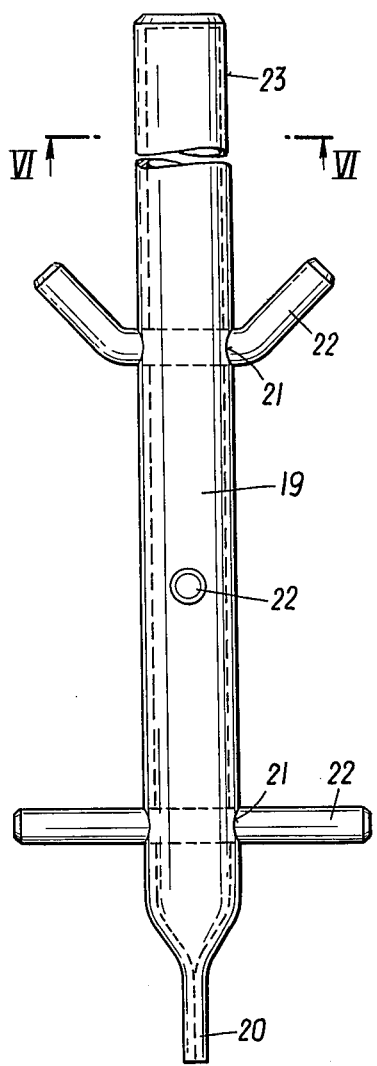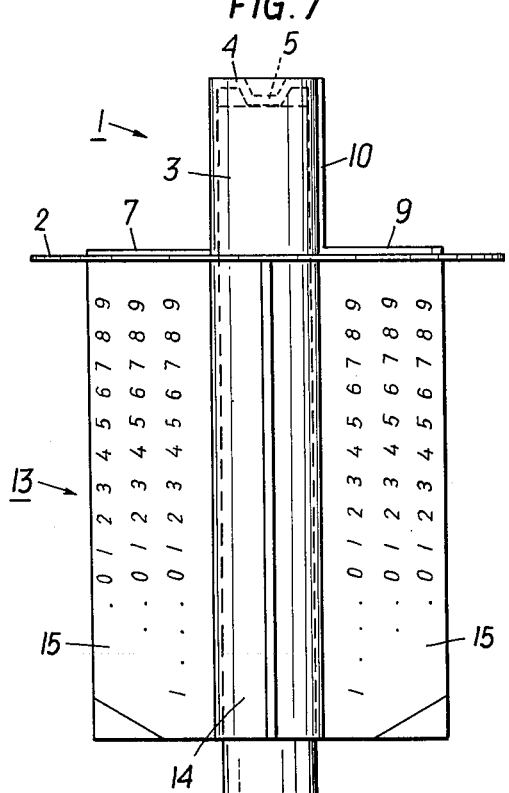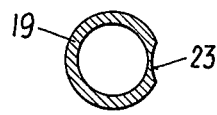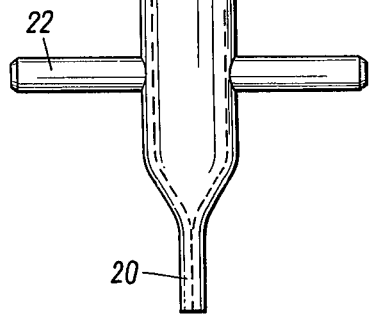

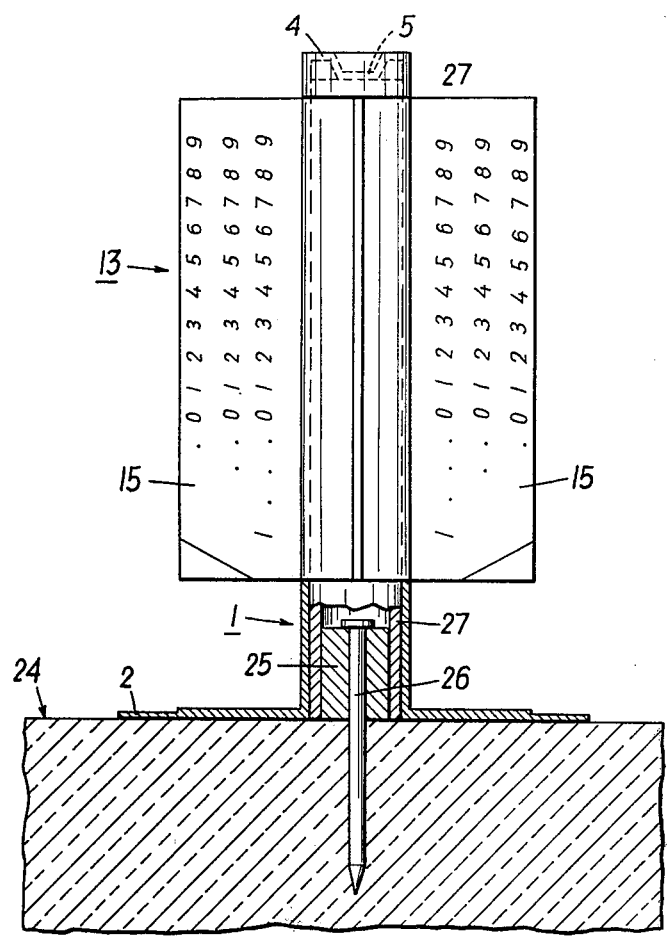
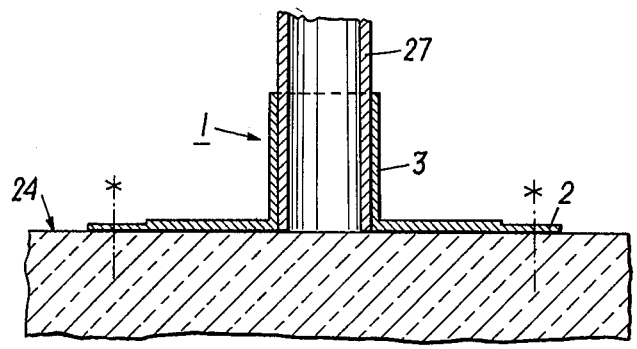

MEANS FOR MARKING OF POINTS WITHIN THE TERRAIN

The present invention refers to a means for marking of points within the terrain, for example for marking of surveying points or of points of path markings, said means comprising an anchoring element and a marking element. The marking element is substantially in the shape of a horizontal disc and is attached to said anchoring element.

It is known to mark surveying points, for example boundary markers between lots of land, within the terrain with boundary stones. Transporting of such stones to the points to be marked as well as erection of such stones at the points to be marked is cumbersome and time-consuming. Also, although such stones can be provided with various distinguishing marks by surface carving as by chiselling, this distinguishing signs into this stones or by brushing paint onto such stones. Chiselling of types procedure is quite laborsome and expensive and has practically become out of use. Placing distinguishing marking on the stones can also be accomplished by painting one or more colors thereon but this procedure is disadvantageous because the paint becomes deteriorated on weathering and because the colour of the paint cannot be ascertained after a certain time so that paint must repeatedly be applied to the stones. Furthermore although a paint varnish could be applied, such only provides for limited distinguishing possibilities.

It is also known to mark boundary points and hiking paths or the like with pegs to be rammed into the ground. Such pegs may additionally be provided with reference arrows and reference boards which, however, frequently become loosened from the peg and accordingly no more serve their purpose.

There is further known a boundary marker or surveying point marker consisting of a disc which can be fixed to walls, road surfaces or the like by means of gun set bolts. Further known are surveying point markers consisting of an elongated rod having an upper broadened end provided with protrusions being arranged along a screw thread line in order to achieve better anchoring. Further known terrain markers consist of a rod having a cap at its upper end and being provided with protruding flaps for better anchoring possibilities.

Finally, there is known a marking element consisting of a carrier rod and directive means adjustably arranged thereon, said directive means allowing the indication of predetermined directions. All these known marking means do provide for only limited distinguishing possibilities and only allow an observer to determine a limited amount of information from the marking point being considered.

The present invention aims at improving a means for marking of points within the terrain such that such means can not only be transported to the particular terrain points to be marked in a simple and inexpensive manner but do also allow to emphasize or mark a plurality of characteristics of the point to be marked. The invention is thus based on a means of the kind described above and essentially consists in that a marking element of generally disc-like configuration is additionally provided with flap-like protrusions extending normally relative to the plane of the disc. The disc is provided with indicia or markings formed in relief on the upper surface thereof so as to provide a permanent characterization of the marking point in consideration. Such markings may be formed by removal of material as by chiselling the surface or by original formation in the surface as by known molding techniques. It is possible and desirable to also provide the flap-like protrusions of the marking element with such markings. Thus, a means for marking of points within the terrain is provided which is of low weight and has a small volume and thus can be transported in a simple manner without additional auxiliary personel, because the marking signs are provided on the flat disc and on the flap-like protrusions and thus no heavy compact body is required. In the present invention, the markings remain intact even upon extended use in contrast to a marking paint. The term "markings" includes indicia formed by elevations on or depressions in the surface of the disc and/or the flaps, respectively. Also, particular indicia on one or more surfaces provided therewith can be delineated by means of material removal such that indicia can be permanently characterized without need of any further surfacing.

Further features and advantages of the present invention result from the following description. Referring to the drawings, schematically showing an embodiment of the invention.

FIG. 5 represents a side elevation of an anchoring element being designed as a carrier rod.

FIG. 6 is a section along line VI—VI of FIG. 5.

FIGS. 7 to 9 illustrate various constructional embodiments for arranging both component parts of the marking element as well as the manner of connecting these component parts with a carrier rod serving as an anchoring element.

Figure 2:
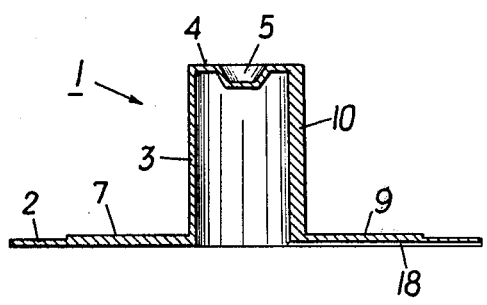
FIG. 2 is a sectional view along line II—II of FIG. 1.
Figure 1:
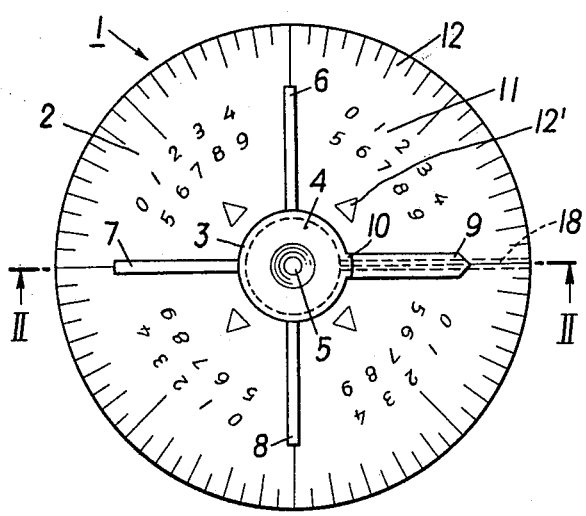
FIG. 1 represents a top-plan view of the marking element being provided with a disc-like flange.

The component part of the marking element is shown in FIGS. 1 and 2 and has a disc-like flange 2 laterally extending from a centrally arranged bushing or tubular hub 3. As is shown in FIG. 2, this bushing 3 extends in upward direction from the upper side of the disc-like flange 2 which is provided with indicia or markings. The bushing is further provided with a tight cover 4 being provided with a depression 5. This depression is to receive and center a compass of known type serving for adjusting the component part 1 according to the cardinal points. For this purpose, the upper side of the disc-like flange is provided with four beam-like marking signs 6 to 9, which extend in radial direction and vertically relative to one another and of which the marking sign 9 is thicker than the other signs. This marking sign 9 is to show, with correct adjusted component part 1, the north direction, so that then the sign 6 will show westward, the sign 7 will show southward and the sign 8 will show eastward. For adjusting the component part 1 it is only necessary to rotate this component part until the marking sign 9 coincides with the needle of a compass placed and accordingly supported on the cover. The compass preferably includes a translucent bottom such that its needle and the marking sign 9 may be conveniently aligned with each other such that the flange 2 is properly orientated with respect to the ground, i.e. marking sign 9 thereof orientated to a magnetic north direction. Adjusting of the component part 1 is facilitated by a thickened wall portion 10 of the bushing 3 being in alignment with the marking sign 9.

In each of the quadrants, laterally bordered by the beam-like marking signs 6 to 9, a row 11 of digits is provided. By means of these rows of digits, the marked points of the terrain can be given a successive numbering. For this purpose and beginning in clockwise direction from the marking sign showing northward, the thousands place is marked within the first quadrant, the hundreds place is marked in the second quadrant, the decimal place is marked in the third quadrant and the unit place is marked in the fourth quadrant, the marking being preferably effected by a punching operation. Such punching operation can, for example, be effected by known, commercially available punch pliers. The area located behind these rows of digits serves for making the owners site of that side from which the survey has been conducted. For this purpose, a hole is being provided at the area marked by a triangle 12' within that quadrant which is located nearest to the owners site or the side of survey operation. Furthermore, at the periphery of the disc-like flange a quadrant scale 12 is provided for each quadrant so that with this quadrant scale the directions to the neighboured surveying points and, respectively, the angles included between these directions and the cardinal points can be marked, which is equally effected by punching.

Figure 3:
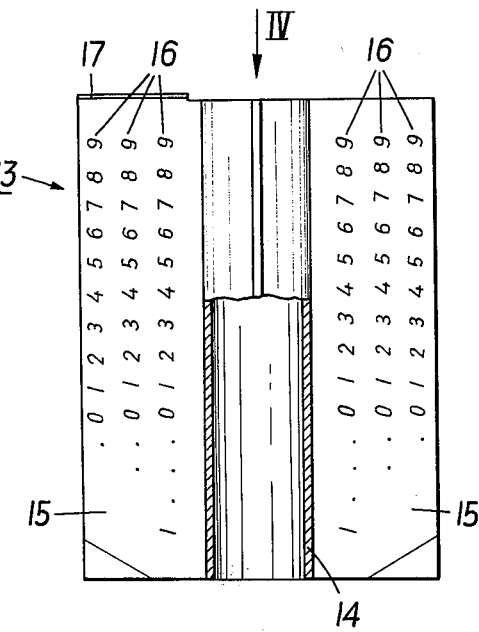
FIG. 3 is a side elevational view partially broken away, of that portion of the marking element having flap-like protrusions.
Figure 4:
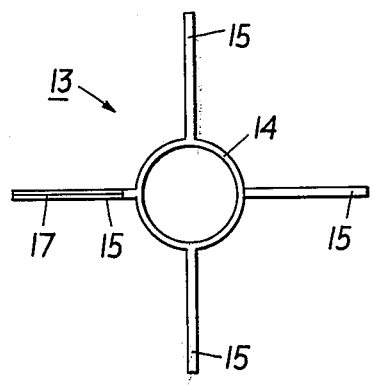
FIG. 4 is a top plan view of that portion of the element shown in FIG. 3.

The component part 13 of the marking element as shown in FIGS. 3 and 4 has four flaps 15 extending from a bushing or central tubular hub 14. These flaps 15 are equally provided with rows 16 of digits. These rows 16 of digits allow to mark the distance of a marking point in consideration to the neighboured marking points in units of length, for instance in meters. Also in this case, marking is being effected by a punching operation, i.e. on that flap-protrusion 15 which, seen in clockwise direction, is located nearest to that punched hole on the quadrant scale 12, which is indicative for the direction to the neighboured marking point in consideration. For this purpose, three rows of digits are provided on each flap-like protrusion 15, noting that, for instance, the outermost row of digits can be used for marking the unit place, the middle row can be used for marking the decimal place and the innermost row of digits can be used for marking the hundreds place. If required, the digit 1 can be provided for marking the thousands place so that distances between marking points ranging to a length to 1999 m can be marked. In practice, greater distances will scarcely be encountered.

For preventing rotation of the component part 13 relative to the component part 1, which could result in errors when marking the distances between marking points, one of the flap-like protrusions 15 is (at 17) provided with an extension adapted for being accommodated within a recess 18 of the flange-like protrusion 2 of the component part 1.

Further characteristics can be made visible by giving the component part 1 and/or the component part 13 different colours. Such different colours can be easily obtained and are weather-resistant particularly when manufacturing said component parts of synthetic plastics material as by known molding techniques.

FIGS. 5 and 6 show an anchoring element formed of a carrier rod 19. This carrier rod includes a tube having been closed at its lower end (at 20) by a pressing operation so that the carrier rod can easily be rammed into the ground. The carrier rod is provided with transverse holes 21 into which locking pins 22 may be inserted. These locking pins become bent on ramming the carrier rod 19 into solid or rocky ground as is illustrated at the upper portion of FIG. 5. In any case, such locking pins form barbs which render substantially difficult or even impossible withdrawal of the carrier rod by unauthorized persons and without special tool. Locking pins 22 need not be used if points need only be marked for a short period as is frequently the case in surveying operation, for example.

The external diameter of the carrier rod 19 corresponds to the inner diameter of the bushings 3 and 14 of the component parts 1 and 13 of the marking element. These bushings can thus be shifted onto the upper end of the carrier rod 19 and will be fixed to the carrier rod, for example by glueing. For facilitating this operation and for preventing the formation of an air cushion within the closed bushing 3, a longitudinal groove 23 is, as is illustrated by FIG. 6, provided at least at the upper end of the carrier rod, said longitudinal groove 23 allowing escape of any air. Furthermore, adhesive matter can be introduced into this longitudinal groove 23, said adhesive matter becoming equally distributed over the contacting surfaces when rotating the component parts 1 and 13 shifted onto the carrier rod 19 and providing a reliable connection between the component parts 1 and 13 on the one hand and the carrier rod 19 on the other hand after having become set. In place of an adhesive connection, the carrier rod 19 can be connected with the component parts 1 and 13 by means of retraction rivets extending through the wall of the carrier rod 19 and the wall of the bushing 3 and the bushing 14, respectively.

FIG. 7 now represents an embodiment of the invention in which the component part 13 having the flap-like protrusions 15 is first placed over the rod 19 and subsequently the component part 1 having the disc-like flange 2. The cover 4 is thus contacting the upper end of the carrier rod 19. In the arrangement according to FIG. 8, a plug 25 is fixed by means of a nail 26 or the like to, for instance, a building part 24, noting that the external diameter of the plug 25 corresponds to the inner diameter of the tube 27 forming the carrier rod 19. The tube 27 may then be cut to the correct length and connected with the plug 25, for example by means of an adhesive. Then, first the component part 1 comprising the disc-like flange and subsequently the component part 13 comprising the flap-like protrusions is placed over this tube 27 and fixed thereon, noting that the disc-like flange 2 of the component part 1 is simultaneously forming a lateral support and that the bottom side of said disc-like protrusion can additionally be connected to the underlying abutting surface by an adhesive. This requires removal of the cover 4 from the bushing 3 of the component part 1. This cover 4 can finally be put on the tube 27, thus again providing a closure for this tube and an abutment and centering means for the compass. Also in this case, all component parts are conveniently connected by adhesive matter.

The embodiment shown in FIG. 9 is differing from the embodiment shown in FIG. 8 only in that no plug 25 and no nail 26 attaching this plug is provided and that in place thereof the bottom side of the disc-like flange 2 of the component part 1 is directly connected to the building part 24 by means of an adhesive.

What I claim is:

1. A marking device for permanently indicating ground locations as for identifying surveying points, paths and the like, said device comprising a marking element and an anchoring element, said marking element including a first component and a second component, said first component having a disc-like flange and said second component having a central tubular hug and a plurality of circumferentially spaced flaps extending radially outwardly from said hub, said disc-like flange positioned above and supported by upper edges of said flaps such that said first and second components of said marking element are longitudinally positioned with respect to each other and said flaps longitudinally extend in a direction normal to the plane of said flange, said disc and said flaps presenting planar surface portions having identifying indicia permanently formed thereon whereby particular indicia may be permanently delineated on said surface portions such that extensive information concerning the ground location so marked may be conveyed to an observer of said device, and means for fixing the relative longitudinal and rotational position of said flange with respect to said flaps such that the information permanently delineated on said planar surface portions of said disc and said flaps may be interrelated, said anchoring element having a generally tubular body over which each of said components is adapted to be disposed with upper portions of the tubular body of said anchoring element disposed within said central tubular hub of said second component such that said marking element is supported by said anchoring element such that said device when said anchoring element is positioned in the ground may identify surveying points and the like.

2. The marking device of claim 1, said indicia formed in said flange and said flaps both being in material relief.

3. The marking device of claim 1, said indicia delineation operable by removal of material adjacent said particular indicia.

4. The marking device of claim 3, said delineation made by forming holes through said material.

5. The marking device of claim 1, there being four equally spaced flaps, each flap disposed at right angles to its adjacent flap.

6. The marking device of claim 1, said anchoring element having openings transversely extending through the body thereof, said openings adapted to receive locking pins which extend outwardly therefrom and are in turn adapted to be upwardly bent by contact with the ground when said device is forced thereinto.

7. The marking device of claim 1, said means for fixing the relative positions of said components comprising a radially extending slot in the under side of said flange, said slot adapted to receive an extension provided on the top of one of said flaps.

8. A marking device for permanently indicating ground locations as for identifying surveying points, paths and the like, said device comprising a marking element and an anchoring element, said marking element including a first component having a disc-like flange and a second component having a central tubular hub and a plurality of spaced flaps extending outwardly therefrom, said anchoring element having a generally tubular body over which each of said components is adapted to be disposed such that first and second components of said marking element are longitudinally positioned with respect to each other such that said flaps extend in a direction normal to the plane of said flange, said disc and said flaps presenting planar surface portions having a identifying indicia permanently formed thereon and means for permanently delineating particular indicia formed on said surface portions such that extensive information concerning the ground location so marked may be conveyed to an observer of said device, said first component including a centrally disposed generally tubular hug from which said flange extends from the bottom thereof, said anchoring element body positioned through each of said hubs, and means for fixing the relative longitudinal and rotational position of said first and second components.

9. The marking device of claim 8, said means for fixing the relative positions of said components comprising a radially extending slot in the under side of said flange, said slot adapted to receive an extension provided on the top of one of said flaps.

10. The marking device of claim 8, said means for fixing the relative positions of said components being adhesive for bonding said hubs to said body, said body further having a longitudinally directed radially inwardly extending groove at least at that end thereof adapted to be connected to said marking element.

11. The marking device of claim 8, the upper end of said first component hub having a removable cover, said cover having a depression formed therein for temporary receipt of a compass such that the device may be directionally orientated with respect to the ground.

* * * * *